United States Patent
Abe et al.

(10) Patent No.: US 6,585,940 B2
(45) Date of Patent: *Jul. 1, 2003

(54) REFORMER

(75) Inventors: Fumio Abe, Handa (JP); Naomi Noda, Ichinomiya (JP); Junichi Suzuki, Kuwana (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/339,288

(22) Filed: Jun. 24, 1999

(65) Prior Publication Data
US 2002/0051741 A1 May 2, 2002

(30) Foreign Application Priority Data
Jun. 29, 1998 (JP) .............................. 10-183013

(51) Int. Cl.$^7$ ................ B01J 8/02; B01J 8/04; B01J 35/02; B01J 35/10; F28D 21/00
(52) U.S. Cl. ................ 422/211; 422/199; 422/222; 48/127.9
(58) Field of Search ................ 422/174, 177, 422/180, 199, 211, 222, 198; 48/61, 127.1, 127.9

(56) References Cited

U.S. PATENT DOCUMENTS

| | | | |
|---|---|---|---|
| 4,365,952 A | * 12/1982 | Ohmukai et al. ........... 239/138 |
| 5,023,276 A | 6/1991 | Yarrington et al. ......... 518/703 |
| 5,268,240 A | * 12/1993 | Miyama ...................... 429/23 |
| 5,441,706 A | * 8/1995 | Whittenberger ............. 422/174 |
| 5,465,573 A | * 11/1995 | Abe et al. ...................... 60/274 |
| 5,538,697 A | * 7/1996 | Abe et al. ................... 422/171 |
| 5,702,838 A | * 12/1997 | Yasumoto et al. ............ 429/40 |
| 5,746,985 A | 5/1998 | Takahashi .................... 422/173 |

FOREIGN PATENT DOCUMENTS

| | | |
|---|---|---|
| EP | 0913357 | 5/1996 |
| GB | 2268694 | 1/1994 |
| JP | 3-295184 | 12/1991 |
| JP | 7-315802 | 12/1995 |
| JP | 8-40703 | 2/1996 |
| WO | 89/10470 | 11/1989 |

OTHER PUBLICATIONS

Patent Abstracts of Japan, vol. 008, No. 067, Mar. 29, 1984, JP 58–219945.

* cited by examiner

Primary Examiner—Jerry D. Johnson
Assistant Examiner—Alexa A. Doroshenk
(74) Attorney, Agent, or Firm—Parkhurst & Wendell, L.L.P.

(57) ABSTRACT

A reformer is disposed in the flow path of a reactant fluid. The reformer includes an electrically heatable heater unit of honeycomb structure, in the upstream of the flow path of a reactant fluid, and a catalyst unit of honeycomb structure capable of generating hydrogen from a reactant fluid containing an organic compound or carbon monoxide, by catalysis, in the downstream of the above heater unit. The heater unit and catalyst unit satisfy the following relationship: Cell density of the heater unit ≦ Cell density of the catalyst unit. The reformer improve efficiency for production of hydrogen and reduce CO as the by-product.

28 Claims, 6 Drawing Sheets

REFORMER

BACKGROUND OF THE INVENTION (1) Field of the Invention

This invention relates to a reformer for hydrogen generation, suitably used in industries and vehicles.

(2) Description of the Related Art

In recent years, production of electricity without causing environmental pollution has drawn attention and an interest in fuel cell has increased. Fuel cell has various advantages such as high efficiency in power generation, formation of small amount of carbon dioxide ($CO_2$) and substantially no formation of harmful substances such as carbon monoxide (CO), nitrogen oxides ($NO_x$) or the like. Therefore, researches and developments on use of fuel cell in on-site type power generator or automobile have been under way recently. In generating electricity using a fuel cell, high-purity hydrogen is required. This hydrogen is produced by using, as a starting material, a hydrocarbon (e.g., butane or propane), an alcohol (e.g., methanol), CO or the like and conducting a catalytic reaction.

The main reaction in the above hydrogen production is steam reforming which takes place in the presence of steam and a catalyst. Since the steam reforming is generally an endothermic reaction although it differs depending upon the starting material used, it is important to heat the catalyst to a desired temperature uniformly. Decrease in reaction temperature invites formation of coke and resultant deactivation of catalyst; therefore, great care is necessary in industrial designing of the reactor.

Further, since the above steam reforming has a low reaction speed unlike combustion reaction, a relatively large catalyst volume is required in treating a given amount of a starting material. Meanwhile, the catalyst functions at high temperature. Hence, a long time is taken to warm up the catalyst. Thus, there have been problems when the steam reforming is utilized in an on-site generator or an automobile where quick hydrogen generation is required.

In conventional catalytic processes for hydrogen production by steam reforming, the catalyst used has generally been heated externally. When a starting material is passed over a fixed catalyst bed and a relatively large reaction tube is used, it is difficult to transfer heat to the center of the catalyst bed and there has been used a complicated mechanism that a tubular reactor is heated by the use of a heating medium such as metal bath, combustion waste gas or the like.

In other conventional catalytic process for hydrogen production by steam reforming, the heating of the catalyst used has been conducted by introducing a combustion waste gas (generated in gas-phase reaction or catalytic combustion) into the reaction tube and heating the catalyst with the heat of the waste gas. This process is not preferred because it increases the flow amount of fluid, reducing the activity of intended reaction and generating more $CO_2$ by combustion.

In the gas produced by the steam reforming, hydrogen has no sufficient purity to be used in a fuel cell and CO has a deactivating effect on the Pt-based electrode used in the fuel cell. Therefore, a CO shift reaction (an aqueous conversion reaction) and a CO selective oxidation reaction are conducted to increase the purity of hydrogen. However, there are many technical problems as to the way in which the catalysts used therein are heated so as to function or the way in which the reactions are allowed to proceed stably.

As still another process for generating hydrogen from a hydrocarbon or the like, there is a process which comprises generating hydrogen and CO by a partial oxidation reaction of a hydrocarbon in place of the above-mentioned steam reforming and then conducting the above-mentioned CO shift reaction and CO selective oxidation reaction to obtain hydrogen. In this process, the partial oxidation reaction of the first step is an exothermic reaction and is substantially free from the problem of heat supply; however, since the reaction temperature is generally higher than that of the steam reforming, technical problems remain unsolved as to how the catalyst temperature is maintained and how high-purity hydrogen is generated in a short time when the process is utilized in an on-site generator or an automobile. As still another process for generating hydrogen from a hydrocarbon or the like, there is a process using a decomposition reaction. A specific example of the decomposition reaction is a decomposition reaction for generating hydrogen from methanol. This reaction is an endothermic reaction similar to the steam reforming, and hence there are the similar problems as mentioned above.

Also in industries where hydrogen is consumed in a large amount, such as ammonia synthesis, hydrogenation, hydrodesulfurization or the like, there are many technical problems to be improved in areas such as reaction efficiency, low operational energy, period of reactor start-up and conversion of the starting material.

SUMMARY OF THE INVENTION

The inventors of the present invention have proposed a reformer of new configuration, as disclosed in Japanese Patent Application No. 9-296004, in an attempt to solve the above problems. This reactor disposed in the flow path of a reactant fluid, which comprises:

a catalyst unit capable of generating hydrogen from a reactant fluid containing an organic compound or carbon monoxide, by catalysis; and an electrically heatable heater unit, wherein honeycomb structures are suitably used both for the catalyst and heater units.

The reactor can generate, in a short time, high-purity hydrogen for a fuel cell utilized in an industrial unit or automobile. However, the inventors of the present invention have found, after extensive studies to still improve the reactor, that there are room for improvements in, e.g., contact efficiency between the catalyst unit and reactant fluid, and heat-exchanging efficiency of the heater units, when two or more units are installed.

The present invention, is achieved based on the above recognition, aims at providing a reformer, disposed in the flow path of a reactant fluid, which comprises a catalyst unit capable of generating hydrogen from a reactant fluid containing an organic compound or carbon monoxide, by catalysis, and an electrically heatable heater unit, wherein improvements are made on the above-mentioned reactor in, e.g., contact efficiency between the catalyst unit and reactant fluid, and heat-exchanging efficiency of the heater units, when two or more units are installed.

According to the present invention, there is provided, as a first invention, a reformer disposed in the flow path of a reactant fluid, which comprises:

an electrically heatable heater unit of honeycomb structure, in the upstream of the flow path of a reactant fluid, and at least one catalyst unit of honeycomb structure capable of generating hydrogen from a reactant fluid containing an organic compound or carbon monoxide, by catalysis, in the downstream of the above heater unit, wherein the heater units and at least one of the catalyst units satisfy the following relationship:

Cell density of the heater unit≦Cell density of the catalyst unit.

Furthermore, according to the present invention, there is provided, as a second invention, a reformer disposed in the flow path of a reactant fluid, which comprises:

two or more electrically heatable heater units of honeycomb structure; and at least one catalyst unit of honeycomb structure capable of generating hydrogen from a reactant fluid containing an organic compound or carbon monoxide, by catalysis, at least at one position between the above heater units, wherein, at least one of the heater units upstream of the catalyst unit (upstream-side heater unit) and at least one of the heater units downstream of the catalyst unit (downstream-side heater unit) satisfy the following relationship:

Cell density of the upstream-side heater unit≧Cell density of the downstream-side heater unit.

Furthermore, according to the present invention, there is provided, as a third invention, a reformer disposed in the flow path of a reactant fluid, which comprises:

two or more electrically heatable heater units of honeycomb structure, adjacent to each other, installed in the direction of fluid flow; and a catalyst unit of honeycomb structure capable of generating hydrogen from a reactant fluid containing an organic compound or carbon monoxide, by catalysis, wherein, at least two adjacent heater units satisfy the following relationship:

Cell density of the upstream-side heater unit≦Cell density of the downstream-side heater unit.

Still more, in the present invention, the term "honeycomb structure" means a structure having a number of through-holes (cells) separated by a partition from each other. Also in the present invention, "a catalyst unit of honeycomb structure capable of generating hydrogen from a reactant fluid containing an organic compound or carbon monoxide, by catalysis" includes a catalyst unit of honeycomb structure which shows a catalytic reaction of increasing purity of hydrogen generated from a reactant fluid containing an organic compound or carbon monoxide, by catalysis, e.g., CO shift reaction and selective oxidation of CO.

DETAILED DESCRIPTION OF PREFERRED EMBODIMENTS

The reformer according to the first invention comprises an electrically heatable heater unit of honeycomb structure in the upstream of the flow path of a reactant fluid, and at least one catalyst unit of honeycomb structure capable of generating hydrogen from a reactant fluid containing an organic compound or carbon monoxide, by catalysis, in the downstream of the heater unit.

In the reformer of the above configuration, the heater unit gives a heat to the reactant fluid containing an organic compound or carbon monoxide, and the catalyst unit, on the other hand, provides the reactant in the fluid with a catalysis site. The former involves a simple heat transfer phenomenon, whereas the latter involves the catalytic process of "adsorption of the reactant on the catalysis site→catalytic reaction→desorption of the product from the catalysis site," and is much more sensitive to contact efficiency between the catalyst unit and reactant fluid. It is therefore preferable to set the catalyst unit at a higher cell density than the heater unit, in order to improve contact efficiency between the catalyst unit and reactant fluid and thereby to improve overall efficiency of the process from heating to reaction. It is particularly important to improve contact efficiency between the reactant fluid and catalysis site, when the reaction involved is not so fast as, e.g., combustion.

Moreover, mixing efficiency of the reactant fluid between the heater unit and catalyst unit can be increased and uneven temperature distribution in the catalyst unit section can be reduced, when the heater unit and catalyst unit are different from each other in cell structure (shape and density) and the downstream catalyst unit has a finer cell structure than the upstream heater unit, i.e., the former has a higher cell density than the latter.

Viewed from the above, the reformer according to the first invention is characterized by at least one heater unit and at least one catalyst unit downstream of the heater unit satisfying the following relationship (1):

$$\text{Cell density of the heater unit} \leqq \text{Cell density of the catalyst unit} \quad (1)$$

Figure 1:
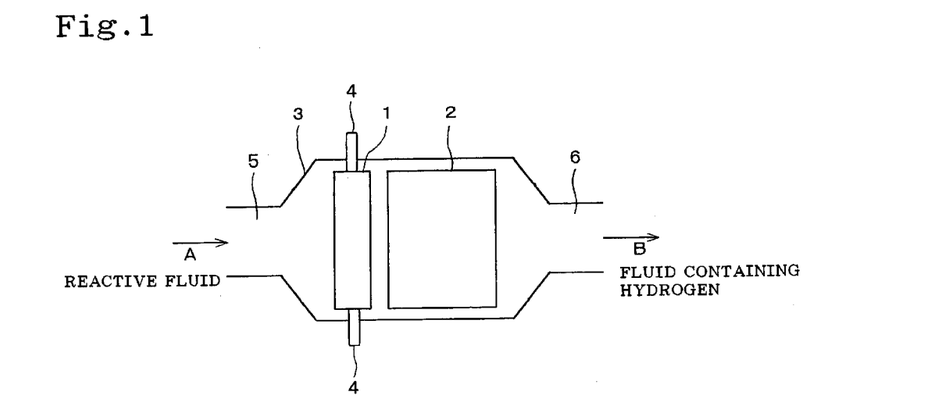
FIG. 1 is a schematic sectional view showing one embodiment of a reformer according to a first invention.

FIG. 1 is a schematic sectional view showing one embodiment of the reformer according to the first invention. In FIG. 1, the reformer comprises a heater unit 1 and a catalyst unit 2 disposed in a metallic casing 3 which forms a flow path of the reactant fluid. The heater unit 1 has electrodes 4, and electricity is supplied thereto from an external electric source not shown in FIG. 1. The heater unit 1 is disposed upstream of the catalyst unit 2. A reactant fluid A is fed into the reformer from an inlet 5, passes through the heater unit 1 and catalyst unit 2, and reaches an outlet 6. A fluid B containing the hydrogen produced leaves the outlet 6 and is transferred to a fuel cell section disposed downstream of the reformer. Both heater unit 1 and catalyst unit 2 are of honeycomb structure, their cell densities satisfying the relationship (1).

In the preferred embodiment shown in FIG. 1, one catalyst unit is disposed in the reformer. However, two or more catalyst units may be disposed. In such a case, the intended effect of the present invention can be secured when the heater unit and at least one of the catalyst units downstream of the heater unit satisfy the relationship (1). The effect will be larger when the heater unit and the catalyst unit adjacent thereto satisfy the relationship (1), and still larger when the heater unit and all of the catalyst units downstream of the heater unit satisfy the relationship (1).

The reformer according to the second invention comprises two or more electrically heatable heater units of honeycomb structure in the flow path of a reactant fluid, and at least one catalyst unit of honeycomb structure capable of generating hydrogen from a reactant fluid containing an organic compound or carbon monoxide, by catalysis, at least at one position between the above heater units.

In the reformer of the above configuration, it is preferable that the heater unit upstream of the catalyst unit (upstream-side heater unit) has a high cell density to improve heat-exchanging efficiency between it and fluid. The heater unit downstream of the catalyst unit (downstream-side heater unit), on the other hand, receives the fluid from the upstream-side heater unit and catalyst unit, both upstream of the downstream-side heater unit, and there are positioned the upstream-side heater unit and the catalyst unit at the upstream-side of the downstream-side heater unit, and the fluid being cooled by the upstream units. When the reformer makes cold starting, the cooled fluid takes heat from the downstream-side heater unit, possibly retarding heating of the heater unit. It is therefore preferable that the downstream-side heater unit has a lower cell density than the upstream-side heater unit, to have a lower contact efficiency with the fluid than the upstream-side heater unit.

In particular, when the catalyst unit disposed between the upstream- and downstream-side heater units is to generate hydrogen, the fluid flowing into the downstream-side heater contains hydrogen at a higher concentration than that flowing into the upstream-side heater. It is therefore preferable that the former fluid is not heated excessively for safety consideration and that the downstream-side heater unit has a lower cell density than the upstream-side heater unit.

Viewed from the above, the reformer of the second invention is characterized by at least one of the heater units upstream of the catalyst unit (upstream-side heater unit) and at least one of the heater units downstream of the catalyst unit (downstream-side heater unit) satisfying the following relationship (2):

$$\text{Cell density of the upstream-side heater unit} \geqq \text{Cell density of the downstream-side heater unit} \quad (2)$$

Figure 2:
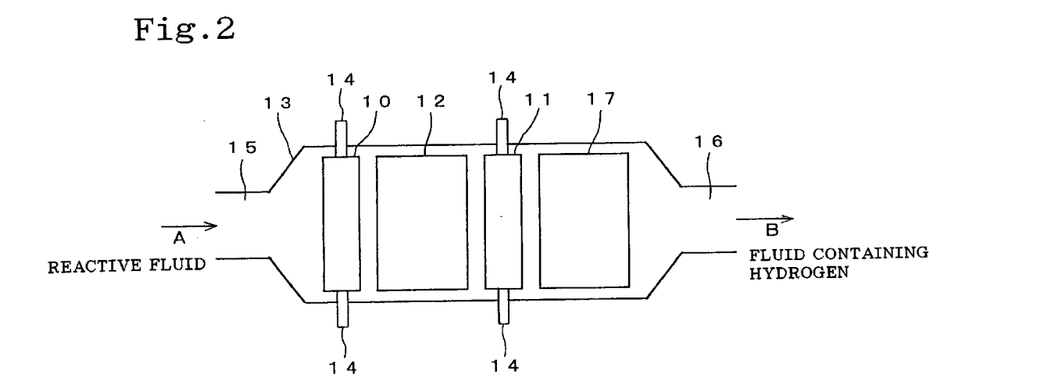
FIG. 2 is a schematic sectional view showing another embodiment of a reformer according to the second invention.

FIG. 2 is a schematic sectional view showing one embodiment of the reformer of the second invention. In FIG. 2, the reformer comprises an upstream-side heater unit 10, a catalyst unit 12, a downstream-side heater unit 11 and a catalyst unit 17, disposed in a metallic casing 13 which forms a flow path of the reactant fluid. Each of the upstream- and downstream-side heater units 10 and 11 has electrodes 14, and electricity is supplied thereto from an external electric source not shown in FIG. 2. The upstream-side heater unit 10 is disposed upstream of the catalyst unit 12, and the downstream-side heater unit 11 downstream of the catalyst unit 12. A reactant fluid A is fed into the reformer from an inlet 15, passes through the upstream-side heater unit 10, catalyst unit 12, downstream-side heater unit 11 and catalyst unit 17, and reaches an outlet 16. A fluid B containing the hydrogen produced leaves the outlet 16 and is transferred to a fuel cell section disposed downstream of the reformer. Both upstream- and downstream-side heater units 10 and 11 are of honeycomb structure, their cell densities satisfying the relationship (2).

In the preferred embodiment shown in FIG. 2, two heater units are disposed in the flow path, an upstream-side heater unit and downstream-side heater unit with a catalyst unit in-between. However, three or more heater units may be disposed, with two or more upstream-side heater units and/or two or more downstream-side heater units. In such a case, the intended effect of the present invention can be secured when at least one of the upstream-side heater units and at least one of the downstream-side heater units satisfy the relationship (2). The effect will be larger when the upstream-side heater unit and the downstream-side heater unit with no constitutional element (e.g., heater unit) except one or more catalyst units in-between satisfy the relationship (2).

It is preferable, when three or more heater units are used with each of two or more catalyst units in-between at different positions, that the upstream-side heater unit and the downstream-side heater unit with respect to the most upstream catalyst unit satisfy the relationship (2). The intended effect will be still larger, when all of the upstream-side and downstream-side heater units satisfy the relationship (2) for the configuration with three or more heater units.

The reformer as the third invention comprises two or more electrically heatable heater units of honeycomb structure adjacently disposed in the flow path of a reactant fluid in the flowing direction of the fluid, and at least one catalyst unit of honeycomb structure capable of generating hydrogen from a reactant fluid containing an organic compound or carbon monoxide, by catalysis.

In the reformer of the above configuration where the fluid is heated by two or more adjacent heater units, the fluid can be continuously and efficiently heated along the flow path from the upstream-side heater unit(s) to the downstream-side heater unit(s), when the downstream-side heater unit has a higher cell density, i.e., a higher heat-exchanging efficiency, than the upstream-side heater unit. When the downstream-side heater unit has a lower heat-exchanging efficiency, i.e., a lower cell density, than the upstream-side heater unit, on the other hand, temperature of the fluid gained by the upstream-side heater unit at a cost may not be kept, or conversely lowered, by the downstream-side heater unit. It is therefore preferable, viewed from overall heating effect, that the downstream-side heater unit has a higher cell density than the upstream-side heater unit.

Mixing efficiency of the reaction fluid between the heater units can be increased, when the upstream- and downstream-side heater units are different from each other in cell structure (shape and density) and the downstream heater unit has a finer cell structure, i.e., a higher cell density, than the upstream heater unit, and uneven temperature distribution in the heater unit or catalyst unit section can be reduced, when the downstream heater unit is followed by an adjacent heater unit or catalyst unit.

Viewed from the above, the reformer of the third invention is characterized by at least two adjacent heater units satisfying the following relationship (3):

Cell density of the upstream-side heater unit≦Cell density of the downstream-side heater unit   (3)

Figure 3:
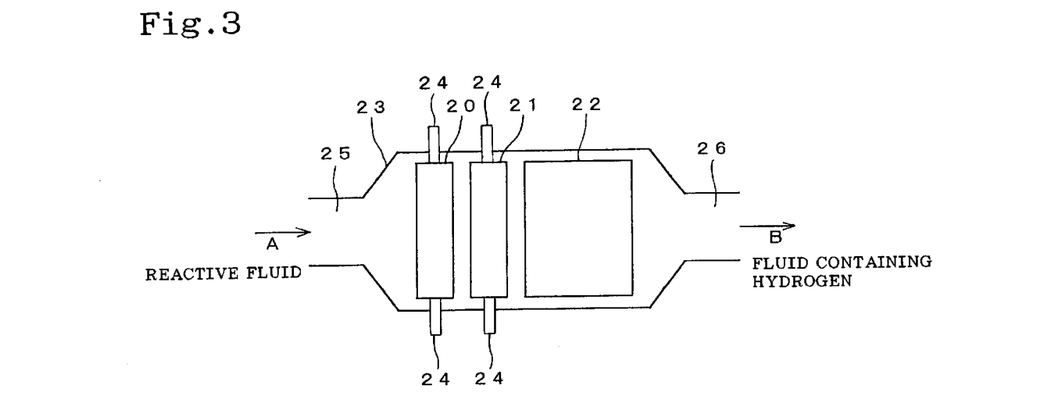
FIG. 3 is a schematic sectional view showing still another embodiment of a reformer according to the third invention.

FIG. 3 is a schematic sectional view showing one embodiment of the reformer of the third invention. In FIG. 3, the reformer comprises an upstream heater unit 20, a downstream heater unit 21 and a catalyst unit 22, disposed in a metallic casing 23 which forms a flow path of the reactant fluid. Each of the upstream- and downstream-side heater units 20 and 21 has electrodes 24, and electricity is supplied thereto from an external electric source not shown in FIG. 3. The upstream heater unit 20 and downstream heater unit 21 are adjacent to each other in the flowing direction of the fluid and followed by the catalyst unit 22 downstream of these two heater units. A reactant fluid A is fed into the reformer from an inlet 25, passes through the upstream heater unit 20, downstream heater unit 21 and catalyst unit 22, and reaches an outlet 26. A fluid B containing the hydrogen produced leaves the outlet 26 and is transferred to a fuel cell section disposed downstream of the reformer. Both upstream- and downstream-side heater units 20 and 21 are of honeycomb structure, their cell densities satisfying the relationship (3).

In the preferred embodiment shown in FIG. 3, two adjacent heater units are disposed in the flow path. However, three or more adjacent heater units may be disposed. In such a case, the intended effect of the present invention can be secured when at least two of the heater units satisfy the relationship (3). The effect will be larger when the most upstream heater unit and the heater unit adjacent thereto satisfy the relationship (3). The effect will be still larger when all of the adjacent heater units satisfy the relationship (3).

The first to third inventions described above may be combined with one another, as required. The common features to the reformers of these inventions will be described below.

In the present invention, there is used, as the starting material for obtaining hydrogen, a reactant fluid containing an organic compound such as hydrocarbon (e.g., butane or propane), or alcohol (e.g., methanol), or carbon monoxide (CO). A hydrocarbon is preferred in view of the transportation via a gas cylinder or pipe. In view of the handleability when mounted on an automobile, a gasoline or alcohol (e.g., methanol), which is a liquid and easy to mount, is preferred. However, the starting material for obtaining hydrogen is not restricted to these. CO is not preferred as the starting material, because it is a toxic gas.

The main reaction in the reformer of the present invention is a steam reforming reaction taking place in the presence of steam. Further, a CO shift reaction and selective CO oxidation reaction are allowed to take place to reduce CO (a by-product), in order to obtain high-purity hydrogen and alleviate the deactivation of the electrode of fuel cell by CO. An example of the reactions taking place when butane is used as a starting material, is shown below.

| (1) $C_4H_{10} + 9H_2O \rightarrow 9H_2 + 4CO$ | Steam reforming reaction |
| (2) $CO + H_2O \rightarrow CO_2 + H_2$ | CO shift reaction |
| (3) $CO + 1/2O_2 \rightarrow CO_2$ | Selective CO oxidation reaction |

Hydrogen can also be obtained by using a partial oxidation reaction in place of the steam reforming reaction.

| (4) $C_4H_{10} + 2O_2 \rightarrow 4CO + 5H_2$ | Partial oxidation reaction |

Following the above partial oxidation reaction, the above reactions (2) and (3) are allowed to proceed to increase the purity of hydrogen. The process for obtaining hydrogen based on the reaction (1) is called steam reforming, and the process for obtaining hydrogen based on the reaction (4) is called partial oxidation. Any of these processes is applicable to the present invention. Use of steam reforming or partial oxidation in hydrogen production is optional. For use in fuel cell mounted on an automobile, partial oxidation is drawing attention when gasoline is used as the starting material, and steam reforming is drawing attention when an alcohol (e.g., methanol) is used as the starting material. In general, steam reforming can produce high-purity hydrogen easily at lower temperature and is more efficient.

As the reaction for generating hydrogen from methanol, there are the following two reactions:

| (5) $CH_3OH \rightarrow CO + H_2$ | Decomposition reaction (endothermic) |
| (6) $CH_3OH + H_2O \rightarrow 3H_2 + CO_2$ | Steam reforming reaction (endothermic) |

In these reactions, different catalysts are generally used (the catalysts used are described later) and the reaction temperatures are also different. The reactions (1), (5) and (6) are generally endothermic, and require temperature of 500° C. or higher. The reactions (2) and (3) are exothermic, and are allowed to proceed at relatively low temperature of 300° C. or lower. The reaction (4) is exothermic and requires temperature of 500° C. or higher. To obtain high-purity hydrogen, the reactions (1) [or (5) or (6)], (2) and (3), or the reactions (4), (2) and (3) are conducted over respective catalysts being disposed in series in the flow path of a reactant fluid. Depending upon hydrogen purity required, it is possible to conduct only the reactions (1) [or (5) or (6)] or the reaction (4) in the reformer; when CO is used as the starting material, the reaction (2) and, as necessary, the reaction (3) are conducted.

The catalyst unit for the present invention contains at least one of the catalyst components having catalysis for the above-mentioned steam reforming, partial oxidation or decomposition, CO shift reaction, selective CO oxidation, etc. Of these, the selective CO oxidation reaction is for reduction in CO and has no direct relation to hydrogen production; however, when high-purity hydrogen is required, this reaction is important and allowed to proceed in the reformer, and the catalyst for the reaction is contained in the catalyst unit.

As the catalyst for generating hydrogen from a reactant fluid containing an organic compound or CO, concrete examples of the preferable ones include a catalyst containing, as main components, a heat-resistant oxide and at least one kind of metal selected from the metal elements of groups VB to VIII, IB and IIB of the long-form periodic table.

As to the metal element effective for steam reforming, partial oxidation or decomposition, it is preferred to use a metal of group VIII as the essential metal element. The preferred metal elements are Ni, Rh, Ru, Ir, Pd, Pt, Co and Fe, and they are used singly or in combination. It is preferred to add thereto, as a promoter catalyst, V or Nb of group VB; Cr, Mo or W of group VIB; Mn or Re of group VIIB; or the like. Also, an alkaline earth metal may be added for prevention of carbonization. These metals are ordinarily loaded on a heat-resistant oxide, whereby the resulting catalyst can have an increased specific surface area, enhanced activity and durability to reaction temperature.

As the heat-resistant oxide, there can be used $Al_2O_3$, $SiO_2$, $TiO_2$, $ZrO_2$, MgO, zeolite, SAPO, ALPO, a layer structure compound or a compound oxide thereof. Of these oxides, one having a specific surface area of ordinarily 5 to 300 m$^2$/g is used. The heat-resistant oxide and the above-mentioned metal component are made into a uniform mixture by a known means such as chemical method (e.g., immersion, coprecipitation or sol-gel), physical mixing or the like. Specific surface of the synthesized catalyst is generally in a range from 5 to 300 m$^2$/g. A specific surface area below 5 m$^2$/g invites reduced activity, and that above 300 m$^2$/g invites striking property change at high temperature and resultant reduction in durability.

As the heat-resistant oxide, alumina ($Al_2O_3$) can be preferably used because it is relatively inexpensive and has a high specific surface area even at high temperature. There can also be used spinel obtained by adding magnesia to alumina, or magnesia (which is a basic carrier) per se or a compound oxide thereof for suppressing carbonization.

The proportion of the catalyst metal added to the heat-resistant oxide is preferably 1 to 30% by weight. When the catalyst metal is a noble metal, addition of up to about 10% by weight is sufficient because the noble metal has a high activity. When the catalyst metal is a base metal such as Ni, addition of 10 to 30% by weight is preferred.

As the catalyst appropriate for CO shift reaction, there is often used Fe or Co of group VIII, Cu of group IB, Zn of group IIB, or the like. The metal elements specified in the present invention show a fairly high activity for CO shift reaction. Since the metals showing an activity at relatively low temperature include Cu, Zn or both, loading of such a metal or metal combination on the above-mentioned heat-resistant oxide (e.g., alumina) can assure high heat-resistance. In such a case, amount of the metal added to the heat-resistant oxide is preferably 10 to 50% by weight. When the CO shift reaction is conducted at relatively high temperature, spinel (e.g., Fe—Cr) per se can also be used.

As the catalyst appropriate for selective CO oxidation reaction, there can be mentioned metals such as Mn of group VII, Co and noble metals of group VIII, Cu, Ag and Au of group IB and the like. They can be used ordinarily by being loaded on the above-mentioned heat-resistant oxide. The catalyst need not oxidize hydrogen produced, and Pt or the like having a strong interactions with CO can be used. A hopcalite catalyst is also one of the preferred catalysts.

The catalyst unit is used in the form of honeycomb structure, which may be made of a catalyst component(s) per se, or may be obtained by loading a catalyst component(s) on a honeycomb carrier made of an inert material such as cordierite, mullite or the like. The suitable materials for the honeycomb carrier include ceramics (e.g., cordierite and mullite), foil-shaped metals composed of heat-resistant stainless steel (e.g., Fe—Cr—Al alloy), and metallic materials formed into honeycomb structure by powder metallurgy. The honeycomb carrier is preferably porous, whether it is a ceramic or metal, for reduced heat capacity and improved catalyst-loading characteristics. Its porosity is preferably in a range from 0.5 to 50%, more preferably 10 to 40%. When the catalyst component is coated on the honeycomb carrier in the form of coating layer, thickness of the coating layer is preferably in a range from 5 to 100 micron. Thickness below 5 micron may invite catalyst deactivation, whereas that above 100 micron increased pressure loss.

The catalyst unit is constituted by arranging, generally in series, a catalyst for steam reforming, partial oxidation or decomposition, a catalyst for CO shift reaction, and a catalyst for selective CO oxidation. The catalyst unit may be obtained by loading respective catalysts on different areas of one honeycomb structure; however, since each catalyst has a different operating temperature, it is preferred to arrange a plurality of catalyst units, each containing a different catalyst, in the reformer.

The heater unit for the present invention also has a honeycomb structure, like the catalyst unit. It may be made of an electrically heatable material per se; however, in view of the warm-up property and reaction acceleration during cold start-up and temperature stabilization of the catalyst unit during steady-state operation, the heater unit preferably contains at least one of the catalyst components having catalysis for the above-mentioned steam reforming, partial oxidation or decomposition, CO shift reaction, selective CO oxidation, etc. The catalyst presence in the heater unit may be achieved by mixing the catalyst(s) with the electrically heatable material (compositing), or more preferably achieved by loading the catalyst(s) on the electrically heatable material. In view of the reaction activity expected, most preferred is a heater unit obtained by loading the catalyst(s) on the honeycomb structure having electrical heatability. The catalyst component for the heater unit may be the same as, or different from, that for the catalyst unit.

As the material for the heater unit, there can be used a sintered material having electrical resistance-heatability, for example, barium titanate (of so-called PTC, a substance having a positive resistance characteristic), carbide (e.g., SiC or $MoSi_2$), superconductive oxide of Y or Bi type, perovskite showing a negative resistance characteristic, oxygen ion-conductive material (e.g., $ZrO_2$), silicide, boride, nitride, or ion-conductive glass although this is not a sintered material. There can also be used a metal having electrical resistance-heatability such as Fe—Cr—Al ferrite composition or other alloy composition (e.g., Ni—Cr, Fe—Al, Fe—Cr or Ni—Al); or a cermet which is a composite material of the above metal and a heat-resistant material having no electrical resistance-heatability (e.g., alumina).

Figure 20:
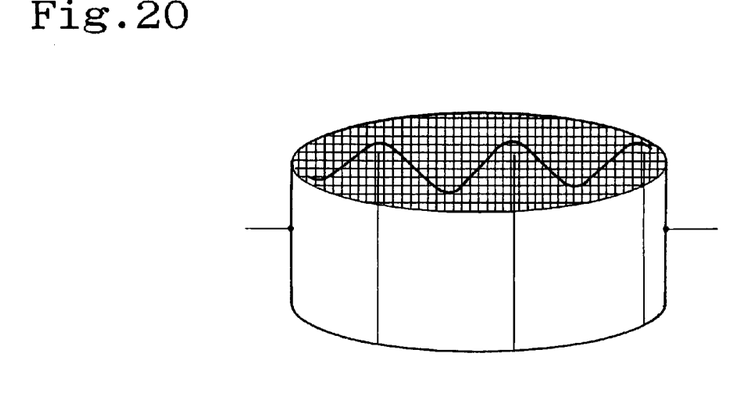
FIG. 20 is a perspective view showing one example of honeycomb structure.
Figure 21:
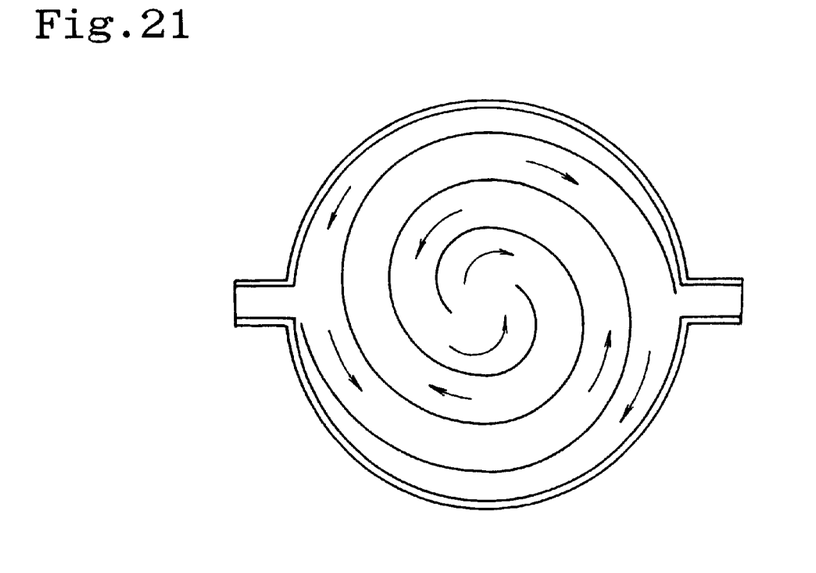
FIG. 21 is a schematic sectional view showing another example of the honeycomb structure.

The above-mentioned materials for the heater unit can be used singly or in the form of composite material of two or more kinds, or may be used as a composite material with a catalyst component(s). Importantly, any material for the heater unit must have electrical heatability, and there is no other restriction as to kind of the material. An alloy composition such as Fe—Cr—Al, Fe—Al, Fe—Cr or the like is preferred in view of the cost and easy production. These alloys are already in commercial use in catalytic converters for automobiles, and have various advantages in that they have excellent heat resistance and thermal shock and can be easily made into a honeycomb structure by rolling or powder metallurgy. Examples of the honeycomb structures are disclosed by, e.g., Japanese Patent Application Kokai (Laid-Open) No. 295184/1991 (FIG. 20) and National Publication of International Patent Application No. 500911/1991 (FIG. 21).

To the heater unit are connected electrodes for electrifying the unit, and electricity is supplied thereto from an external electric source. When the reformer is mounted on an automobile, the electric source can be a battery, alternator, capacitor (condenser) or the like. When a plurality of heater units are disposed in the reformer, they may be independently connected to the electric sources, or arranged in series or parallel to be connected to one source. In the heater unit, the resistance must be adjusted depending upon the power supplied, voltage used, etc. There is no restriction as the adjustment of the resistance; however, when the heater unit is a honeycomb structure, the adjustment can be made by forming slits or gaps therein, as disclosed by Japanese Patent Application Kokai (Laid-Open) No. 295184/1991 and National Publication of International Patent Application No. 500911/1991.

Both catalyst unit and heater unit preferably have a cell density of 4 to 2000 cells/in$^2$ (cpsi), more preferably 50 to 1500 cpsi, to satisfy the condition for each of the first to the third inventions. Cell density below 4 cpsi may invite insufficient contact efficiency and hence insufficient unit function (heating for the heater unit and catalytic reaction for the catalyst unit). Cell density above 2000 cpsi, on the other hand, may invite an excessive pressure loss. The cell section can be of any shape, e.g., circular, square, polygonal or corrugated.

EXAMPLES

The present invention is described in more detail, which by no means limits the present invention.
[Production of Heater Units]
The heater units A to I were produced by the following procedures.
(Heater Unit A)
Powdered Fe, Cr-30Al (wt. %), Fe-50Al (wt. %), Fe-20B (wt. %) and $Y_2O_3$, all having an average particle size of 44 micron or less, were mixed to have a composition of Fe-16Cr-8Al-0.05B-0.5$Y_2O_3$, and 100 g of the mixture was incorporated with 4 g of methyl cellulose as the organic binder and 1 g of oleic acid as the oxidation inhibitor. The mixture thus prepared was extruded into a cylindrical honeycomb structure, which was dried at 90° C. for 16 h in air, sintered at 1325° C. for 2 h in a hydrogen atmosphere, and thermally treated at 1150° C. for 30 min in air.

The honeycomb structure produced by the above procedure had an outer diameter of 93 mm, thickness of 30 mm, thickness of partition wall of 0.1 mm (approximately 4 mil), and cell density of 400 cpsi (hexagonal cells). It was provided with slits, to allow rapid heating of the central portion, to produce the honeycomb heater (FIG. 20). The honeycomb heater was then provided with electrodes, and disposed in a metallic casing of stainless steel while kept insulated from the casing, to produce the heater unit A. It has an effective volume of 0.2 L.
(Heater Unit B)
The heater unit B was produced in a manner similar to that for the heater unit A, except that the honeycomb structure had a cell density of 600 cpsi.
(Heater Unit C)
Commercial γ-$Al_2O_3$ having a specific surface area of 200 m$^2$/g was impregnated with an aqueous solution containing Ru, dried and sintered at 600° C., to prepare the Ru-impregnated $Al_2O_3$ powder, which was mixed with adequate quantities of water and acetic acid, and shredded under the wet condition into the slurry. The slurry was loaded on the honeycomb structure having a cell density of 400 cpsi (similar to the heater unit A). The slurry-loaded honeycomb structure was sintered at 500° C. It was then provided with slits and electrodes, and disposed in a metallic casing in a manner similar to that for the heater unit A, to produce the heater unit C carrying the catalyst component for steam reforming.
(Heater Unit D)
The heater unit D of honeycomb structure carrying the catalyst component for steam reforming was produced in a manner similar to that for the heater unit C, except that the honeycomb structure on which the slurry was loaded had a cell density of 300 cpsi.
(Heater Unit E)
The heater unit E of honeycomb structure carrying the catalyst component for steam reforming was produced in a manner similar to that for the heater unit C, except that the honeycomb structure on which the slurry was loaded had a cell density of 500 cpsi.
(Heater Unit F)
Commercial γ-$Al_2O_3$ having a specific surface area of 200 m$^2$/g was impregnated with an aqueous solution containing copper acetate and another aqueous solution containing zinc acetate, dried and sintered at 500° C., to prepare the Cu/Zn-impregnated $Al_2O_3$ powder, which was mixed with adequate quantities of water and acetic acid, and shredded under the wet condition into the slurry. The slurry was loaded on the honeycomb structure having a cell density of 400 cpsi (similar to the heater unit A). The slurry-loaded honeycomb structure was sintered at 500° C. It was then provided with slits and electrodes, and disposed in a metallic casing in a manner similar to that for the heater unit A, to produce the heater unit F carrying the catalyst component for CO shift reaction.
(Heater Unit G)
The heater unit G of honeycomb structure carrying the catalyst component for CO shift reaction was produced in a manner similar to that for the heater unit F, except that the honeycomb structure on which the slurry was loaded had a cell density of 300 cpsi.
(Heater Unit H)
The heater unit H of honeycomb structure carrying the catalyst component for CO shift reaction was produced in a manner similar to that for the heater unit F, except that the honeycomb structure on which the slurry was loaded had a cell density of 600 cpsi.
(Heater Unit I)
Commercial γ-$Al_2O_3$ having a specific surface area of 200 m$^2$/g was impregnated with an aqueous solution containing $H_2PtCl_5$, dried and sintered at 500° C., to prepare the Pt-impregnated $Al_2O_3$ powder, which was mixed with adequate quantities of water and acetic acid, and shredded under the wet condition into the slurry. The slurry was loaded on the honeycomb structure having a cell density of 200 cpsi (similar to the heater unit A except for cell density). The slurry-loaded honeycomb structure was sintered at 500° C. It was then provided with slits and electrodes, and disposed in a metallic casing in a manner similar to that for the heater unit A, to produce the heater unit I carrying the catalyst component for selective CO oxidation.

[Production of Catalyst Units]

The catalyst units A to N were produced by the following procedures. All of the catalyst units had a common quantity of the catalyst component per unit volume of the honeycomb structure. Since $Al_2O_3$ accounted for most of the catalyst component, its heat capacity per unit volume of the honeycomb structure on which it was loaded was essentially the same.

(Catalyst Unit A)

The same slurry as that used for producing the heater unit C was loaded on a carrier of honeycomb structure (cell density: 600 cpsi, volume: 1.0 L, outer diameter: 93 mm, thickness of partition wall: 0.15 mm (approximately 6 mil), cell shape: hexagonal) of cordierite (NGK Insulators, Ltd.). The slurry-loaded honeycomb structure was sintered at 500° C., to produce the catalyst unit A carrying the catalyst component for steam reforming.

(Catalyst Unit B)

The catalyst unit B of honeycomb structure carrying the catalyst component for steam reforming was produced in a manner similar to that for the catalyst unit A, except that the honeycomb structure on which the slurry was loaded had a cell density of 400 cpsi.

(Catalyst Unit C)

The catalyst unit C of honeycomb structure carrying the catalyst component for steam reforming was produced in a manner similar to that for the catalyst unit A, except that the honeycomb structure on which the slurry was loaded had a volume of 0.8 L.

(Catalyst Unit D)

The catalyst unit D of honeycomb structure carrying the catalyst component for steam reforming was produced in a manner similar to that for the catalyst unit A, except that the honeycomb structure on which the slurry was loaded had a volume of 0.6 L.

(Catalyst Unit E)

The catalyst unit E of honeycomb structure carrying the catalyst component for steam reforming was produced in a manner similar to that for the catalyst unit A, except that the honeycomb structure on which the slurry was loaded had a cell density of 300 cpsi and volume of 0.8 L.

(Catalyst Unit F)

The catalyst unit F of honeycomb structure carrying the catalyst component for steam reforming was produced in a manner similar to that for the catalyst unit A, except that the honeycomb structure on which the slurry was loaded had a cell density of 300 cpsi and volume of 0.6 L.

(Catalyst Unit G)

The same slurry as that used for producing the heater unit F was loaded on a carrier of honeycomb structure (cell density: 600 cpsi, volume: 1.0 L, outer diameter: 93 mm, thickness of partition wall: 0.15 mm (approximately 6 mil), cell shape: hexagonal) of cordierite (NGK Insulators, Ltd.). The slurry-loaded honeycomb structure was sintered at 500° C., to produce the catalyst unit G carrying the catalyst component for CO shift reaction.

(Catalyst Unit H)

The catalyst unit H of honeycomb structure carrying the catalyst component for CO shift reaction was produced in a manner similar to that for the catalyst unit G, except that the honeycomb structure on which the slurry was loaded had a cell density of 400 cpsi.

(Catalyst Unit I)

The catalyst unit I of honeycomb structure carrying the catalyst component for CO shift reaction was produced in a manner similar to that for the catalyst unit G, except that the honeycomb structure on which the slurry was loaded had a volume of 0.8 L.

(Catalyst Unit J)

The catalyst unit J of honeycomb structure carrying the catalyst component for CO shift reaction was produced in a manner similar to that for the catalyst unit G, except that the honeycomb structure on which the slurry was loaded had a cell density of 400 cpsi and volume of 0.8 L.

(Catalyst Unit K)

The catalyst unit K of honeycomb structure carrying the catalyst component for CO shift reaction was produced in a manner similar to that for the catalyst unit G, except that the honeycomb structure on which the slurry was loaded had a cell density of 400 cpsi and volume of 0.6 L.

(Catalyst Unit L)

The same slurry as that used for producing the heater unit C was loaded on the upper half of a carrier of honeycomb structure (cell density: 600 cpsi, volume: 2.0 L, outer diameter: 93 mm, thickness of partition wall: 0.15 mm (approximately 6 mil), cell shape: hexagonal) of cordierite (NGK Insulator, Ltd.), and the same slurry as that used for producing the heater unit F was loaded on the lower half of the above carrier. The slurry-loaded honeycomb structure was sintered at 500° C., to produce the catalyst unit L carrying the catalyst components for steam reforming and CO shift reaction at different positions on the same carrier.

(Catalyst Unit M)

The same slurry as that used for producing the heater unit I was loaded on a carrier of honeycomb structure (cell density: 600 cpsi, volume: 1.0 L, outer diameter: 93 mm, thickness of partition wall: 0.15 mm (approximately 6 mil), cell shape: hexagonal) of cordierite (NGK Insulator, Ltd.). The slurry-loaded honeycomb structure was sintered at 500° C., to produce the catalyst unit M carrying the catalyst component for selective CO oxidation.

(Catalyst Unit N)

The catalyst unit N of honeycomb structure carrying the catalyst component for selective CO oxidation was produced in a manner similar to that for the catalyst unit M, except that the honeycomb structure on which the slurry was loaded had a cell density of 400 cpsi.

(Catalyst Unit O)

The catalyst unit O of honeycomb structure carrying the catalyst component for selective CO oxidation was produced in a manner similar to that for the catalyst unit M, except that the honeycomb structure on which the slurry was loaded had a volume of 0.8 L.

[Configuration of Reformers]

The reformers of the following configurations were produced using the heater units and catalyst units described above. The notation numbers in the drawings in parentheses are attached to each of the heater units and catalyst units, to clearly distinguish the heater unit/catalyst unit types from notation numbers.

(Reformer A)

Figure 4:
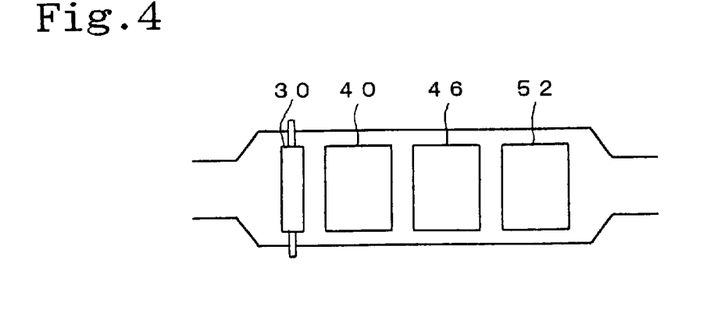
FIG. 4 is a schematic sectional view of the reformer of one embodiment of the present invention (EXAMPLE 1).

The reformer A comprised the heater unit A(30), catalyst unit A(40), catalyst unit G(46) and catalyst unit M(52) in this order in the flow path from the upstream (FIG. 4).

(Reformer B)

Figure 5:
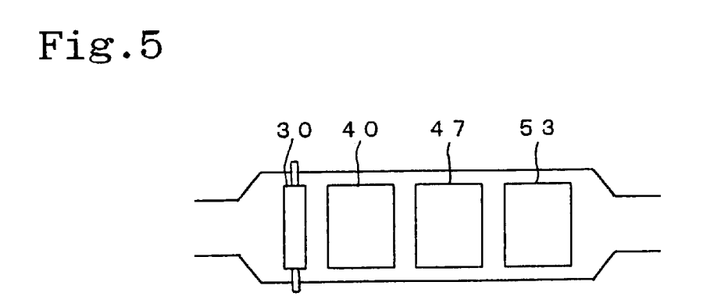
FIG. 5 is a schematic sectional view of the reformer of another embodiment of the present invention (EXAMPLE 2).

The reformer B comprised the heater unit A(30), catalyst unit A(40), catalyst unit H(47) and catalyst unit N(53) in this order in the flow path from the upstream (FIG. 5).

(Reformer C)

Figure 6:
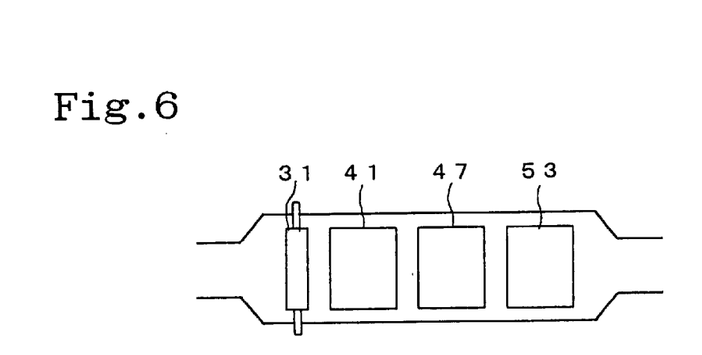
FIG. 6 is a schematic sectional view of the reformer (COMPARATIVE EXAMPLE).

The reformer C comprised the heater unit B(31), catalyst unit B(41), catalyst unit H(47) and catalyst unit N(53) in this order in the flow path from the upstream (FIG. 6).

(Reformer D)

Figure 7:
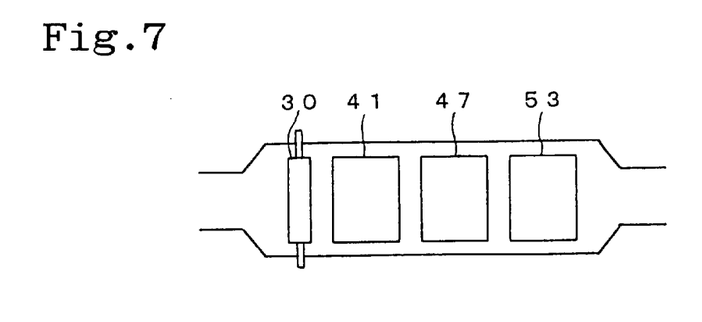
FIG. 7 is a schematic sectional view of the reformer of still another embodiment of the present invention (EXAMPLE 3).

The reformer D comprised the heater unit A(30), catalyst unit B(41), catalyst unit H(47) and catalyst unit N(53) in this order in the flow path from the upstream (FIG. 7).

(Reformer E)

Figure 8:
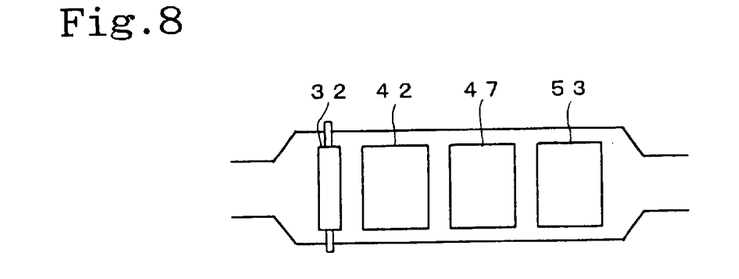
FIG. 8 is a schematic sectional view of the reformer of still another embodiment of the present invention (EXAMPLE 4).

The reformer E comprised the heater unit C(32), catalyst unit C(42), catalyst unit H(47) and catalyst unit N(53) in this order in the flow path from the upstream (FIG. 8).

(Reformer F)

Figure 9:
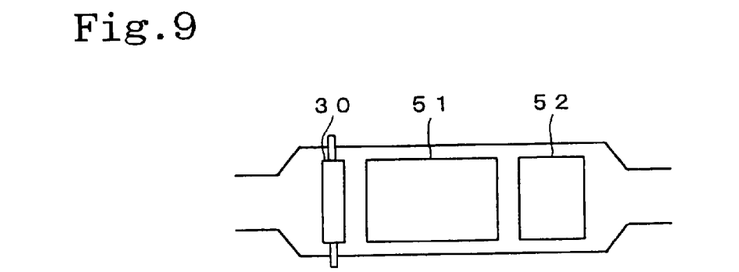
FIG. 9 is a schematic sectional view of the reformer of still another embodiment of the present invention (EXAMPLE 5).

The reformer F comprised the heater unit A(30), catalyst unit L(51) and catalyst unit M(52) in this order in the flow path from the upstream (FIG. 9).

(Reformer G)

Figure 10:
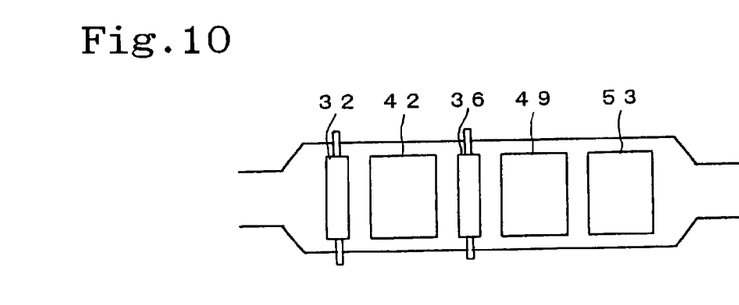
FIG. 10 is a schematic sectional view of the reformer of still another embodiment of the present invention (EXAMPLE 6).

The reformer G comprised the heater unit C(32), catalyst unit C(42), heater unit G(36), catalyst unit J(49) and catalyst unit N(53) in this order in the flow path from the upstream (FIG. 10).

(Reformer H)

Figure 11:
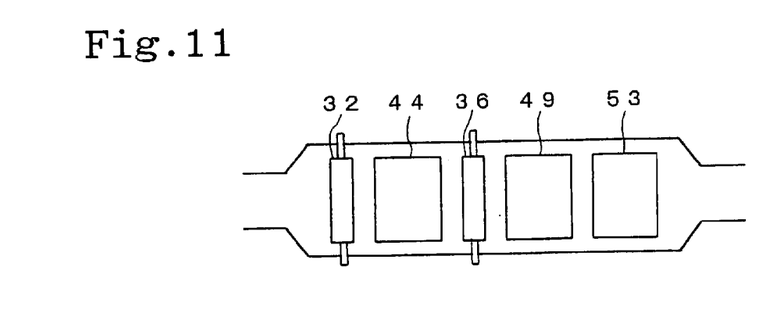
FIG. 11 is a schematic sectional view of the reformer of still another embodiment of the present invention (EXAMPLE 7).

The reformer H comprised the heater unit C(32), catalyst unit E(44), heater unit G(36), catalyst unit J(49) and catalyst unit N(53) in this order in the flow path from the upstream (FIG. 11).

(Reformer I)

Figure 12:
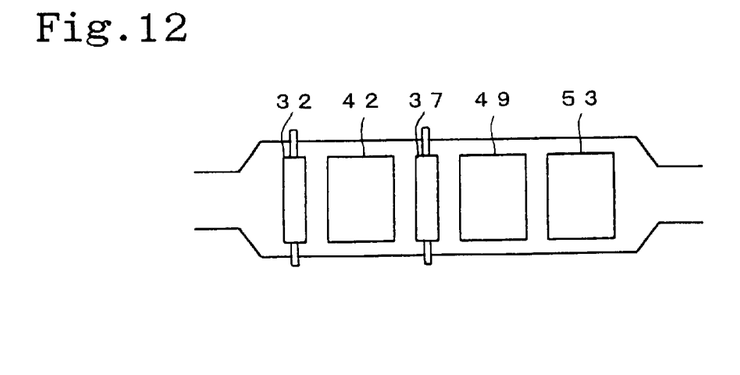
FIG. 12 is a schematic sectional view of the reformer of still another embodiment of the present invention (EXAMPLE 8).

The reformer I comprised the heater unit C(32), catalyst unit C(42), heater unit H(37), catalyst unit J(49) and catalyst unit N(53) in this order in the flow path from the upstream (FIG. 12).

(Reformer J)

Figure 13:
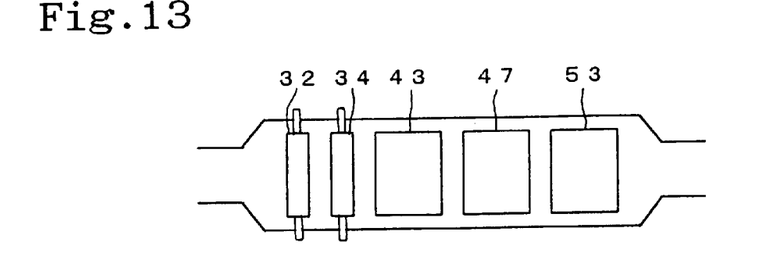
FIG. 13 is a schematic sectional view of the reformer of still another embodiment of the present invention (EXAMPLE 9).

The reformer J comprised the heater unit C(32), heater unit E(34), catalyst unit D(43), catalyst unit H(47) and catalyst unit N(53) in this order in the flow path from the upstream (FIG. 13).

(Reformer K)

Figure 14:
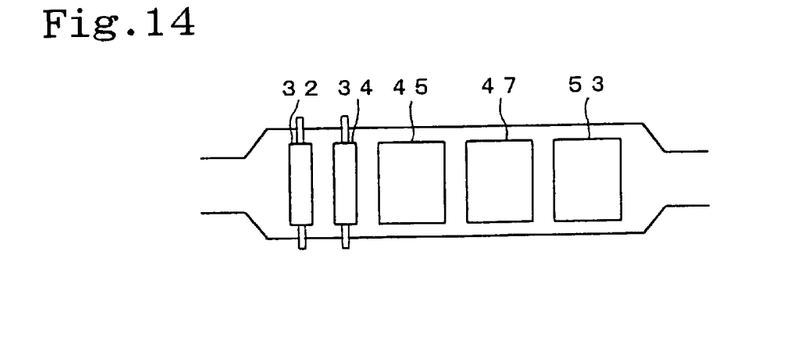
FIG. 14 is a schematic sectional view of the reformer of still another embodiment of the present invention (EXAMPLE 10).

The reformer K comprised the heater unit C(32), heater unit E(34), catalyst unit F(45), catalyst unit H(47) and catalyst unit N(53) in this order in the flow path from the upstream (FIG. 14).

(Reformer L)

Figure 15:
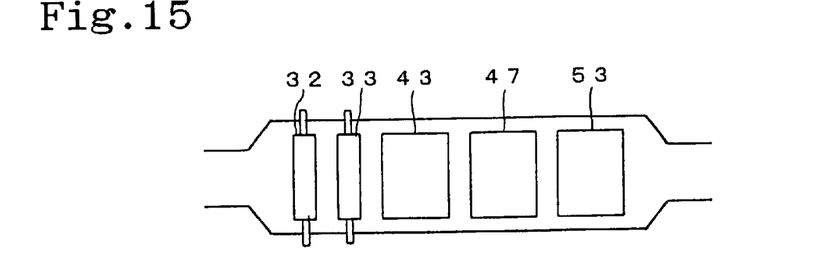
FIG. 15 is a schematic sectional view of the reformer of still another embodiment of the present invention (EXAMPLE 11).

The reformer L comprised the heater unit C(32), heater unit D(33), catalyst unit D(43), catalyst unit H(47) and catalyst unit N(53) in this order in the flow path from the upstream (FIG. 15).

(Reformer M)

Figure 16:
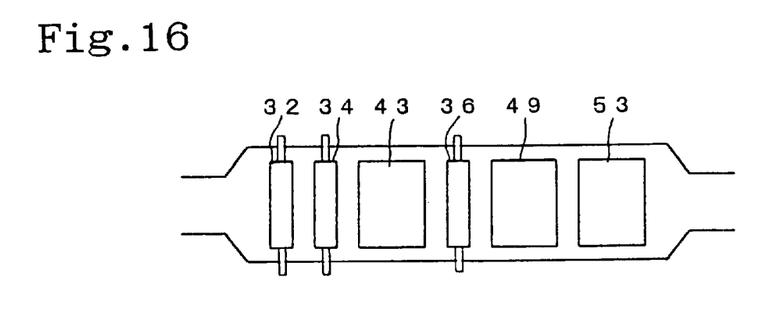
FIG. 16 is a schematic sectional view of the reformer of still another embodiment of the present invention (EXAMPLE 12).

The reformer M comprised the heater unit C(32), heater unit E(34), catalyst unit D(43), heater unit G(36), catalyst unit J(49) and catalyst unit N(53) in this order in the flow path from the upstream (FIG. 16).

(Reformer N)

Figure 17:
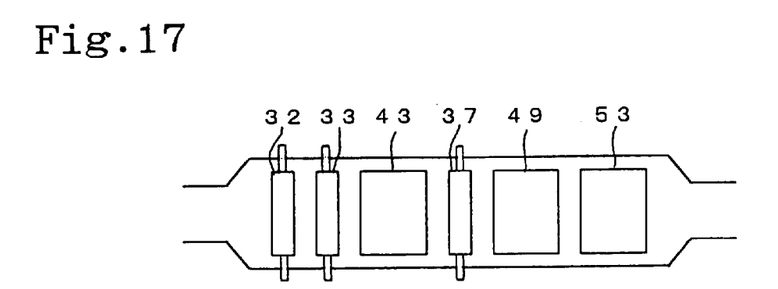
FIG. 17 is a schematic sectional view of the reformer of still another embodiment of the present invention (EXAMPLE 13).

The reformer N comprised the heater unit C(32), heater unit D(33), catalyst unit D(43), heater unit H(37), catalyst unit J(49) and catalyst unit N(53) in this order in the flow path from the upstream (FIG. 17).

(Reformer O)

Figure 18:
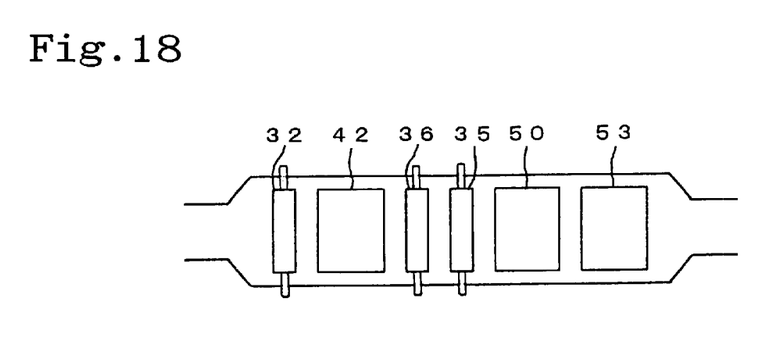
FIG. 18 is a schematic sectional view of the reformer of still another embodiment of the present invention (EXAMPLE 14).

The reformer O comprised the heater unit C(32), catalyst unit C(42), heater unit G(36), heater unit F(35), catalyst unit K(50) and catalyst unit N(53) in this order in the flow path from the upstream (FIG. 18).

(Reformer P)

Figure 19:
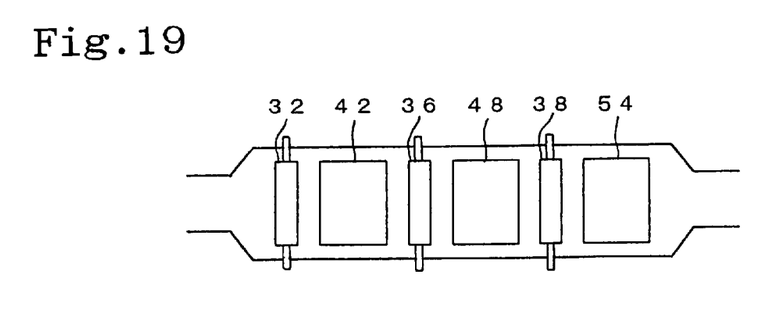
FIG. 19 is a schematic sectional view of the reformer of still another embodiment of the present invention (EXAMPLE 15).

The reformer P comprised the heater unit C(32), catalyst unit C(42), heater unit G(36), catalyst unit I(48), heater unit I(38) and catalyst unit O(54) in this order in the flow path from the upstream (FIG. 19).

[Assessment of Reformer]

A mixture of methanol ($CH_3OH$) and water was fed to each of the above reformers A to P at a constant rate, where the steam carbon ratio (S/C) in the starting mixture was set at 2.0. Electricity was supplied to each heater unit, to a total power of 2.5 kW, where supply of electricity and that of the starting mixture to each reformer were started at the same time. Electricity was supplied continuously to the heater unit upstream of the catalyst unit carrying the catalyst component for steam reforming and to the heater unit carrying the catalyst component for steam reforming while the starting mixture was fed, because of the endothermic nature of steam reforming. For the reformer involving the heater unit carrying the catalyst component for CO shift reaction, supply of electricity to that heater unit was stopped when it reached 300° C., because of the exothermic nature of the reaction. For the reformer simultaneously having the catalyst unit carrying the catalyst component for CO shift reaction and that carrying the catalyst component for selective CO oxidation, air was fed to the system between these catalyst units, to supply oxygen required by the latter.

Conversion of methanol attained for 3 min (including time for cold starting) was measured for each reformer, where the conversion was determined by dividing a total mol number of CO and $CO_2$ formed by mol number of methanol fed. The conversion, used as a measure of hydrogen production efficiency, for each reformer is given in Table 1. Concentration of CO in the effluent gas is used as a measure of CO abatement efficiency for the catalyst unit carrying the catalyst component for CO shift reaction and that carrying the catalyst component for selective CO oxidation. It was measured 1 and 3 min after supply of the starting mixture was started, to assess cold starting capacity of the reformer. The results are also given in Table 1.

TABLE 1

| | Reformer | Conversion of Methanol (%) | Concentration of CO in Effluent Gas (ppm) in 1 min | Concentration of CO in Effluent Gas (ppm) in 3 min |
|---|---|---|---|---|
| EXAMPLE 1 | A | 70 | 65 | 20 |
| EXAMPLE 2 | B | 68 | 70 | 20 |
| COMPARATIVE EXAMPLE | C | 58 | 65 | 20 |
| EXAMPLE 3 | D | 64 | 65 | 20 |
| EXAMPLE 4 | E | 75 | 60 | 15 |
| EXAMPLE 5 | F | 69 | 95 | 30 |
| EXAMPLE 6 | G | 77 | 35 | 5 |
| EXAMPLE 7 | H | 56 | 30 | 5 |
| EXAMPLE 8 | I | 76 | 45 | 10 |
| EXAMPLE 9 | J | 81 | 55 | 10 |
| EXAMPLE 10 | K | 60 | 50 | 10 |
| EXAMPLE 11 | L | 78 | 50 | 10 |
| EXAMPLE 12 | M | 83 | 25 | 5 |
| EXAMPLE 13 | N | 77 | 45 | 10 |
| EXAMPLE 14 | O | 76 | 20 | 5 |
| EXAMPLE 15 | P | 76 | 25 | 5 |

As described above, the reformer of the present invention is improved in, e.g., contact efficiency between the catalyst unit and reactant fluid, and heat-exchanging efficiency of the heater units, resulting in improved efficiency for production of hydrogen and reduction in CO as the by-product.

What is claimed is:

1. A reformer disposed in a flow path of a reactant fluid wherein the reactant fluid flows in a flow path from an upstream position to a downstream position, said reformer consisting of:

a reformer inlet for said reactant fluid to be reformed;

an electrically heatable heater unit of honeycomb structure, in the upstream of the flow path of said reactant fluid after it enters said inlet;

at least one catalyst unit of honeycomb structure for generating hydrogen from said reactant fluid containing an organic compound or carbon monoxide by catalysis, in the downstream of the above heater unit;

an outlet for a reformed gas containing hydrogen;

a fuel cell section which uses said reformed gas; and means to transfer said reformed gas from said outlet to said fuel cell section, wherein, the heater unit and said at least one catalyst unit satisfy the following relationship:

Cell density of the heater unit $\leq$ Cell density of the at least one catalyst unit.

2. The reformer according to claim 1, wherein said heater unit and two or more catalyst units adjacent thereto satisfy the following relationship:

Cell density of the heater unit $\leq$ Cell density of the catalyst units.

3. The reformer according to claim 1, wherein said heater unit and two or more catalyst units downstream of the said heater unit satisfy the following relationship:

Cell density of the heater unit $\leq$ Cell density of the catalyst units.

4. The reformer according to claim 1, wherein said at least one catalyst unit contains one or more catalyst components selected from the group consisting of catalyst components for: steam reforming, partial oxidation, partial decomposition, CO shift reaction, and selective CO oxidation.

5. The reformer according to claim 4, wherein said one or more catalyst components contains a heat-resistant oxide and at least one metal element selected from the group consisting of V, Nb, Ta, Cr, Mo, W, Mn, Tc, Re, Fe, Ru, Os, Co, Rh, Ir, Ni, Pd, Pt, Cu, Ag, Au, Zn, Cd, and Hg.

6. The reformer according to claim 5, wherein said at least one metal element is at least one of those selected from the group consisting of Fe, Ru, Os, Co, Rh, Ir, Ni, Pd, Pt, V, Cr, No, W, Re, Cu, Ag, Au, and Zn.

7. The reformer according to claim 5, wherein said heat-resistant oxide is selected from the group consisting of $Al_2O_3$, $SiO_2$, $TiO_2$, $ZrO_2$, MgO, zeolite, SAPO, ALPO, a layer structure compound and a compound oxide thereof.

8. The reformer according to claim 1, wherein said heater unit contains one or more catalyst components selected from the group consisting of catalyst components for: steam reforming, partial oxidation, partial decomposition, CO shift reaction, and selective CO oxidation.

9. The reformer according to claim 1, wherein said heater unit is composed of a sintered or metallic material having electrical resistance-heatability or a composite thereof, or a composite of a heat-resistant material having no electrical resistance-heatability and the above sintered or metallic material.

10. A reformer disposed in a flow path of a reactant fluid wherein the reactant fluid flows in a flow path from an upstream position to a downstream position, said reformer consisting of:

a reformer inlet for said reactant fluid to be reformed;

two or more electrically heatable heater units of honeycomb structure;

at least one catalyst unit of honeycomb structure for generating hydrogen from said reactant fluid containing an organic compound or carbon monoxide, by catalysis, being positioned between the two or more heater units;

an outlet for a reformed gas containing hydrogen;

a fuel cell section which uses said reformed gas; and means to transfer said reformed gas from said outlet to said fuel cell section, wherein, at least one of the heater units upstream of the positioned catalyst unit (upstream-side heater unit) and at least one of the heater units downstream of the positioned catalyst unit (downstream-side heater unit) satisfy the following relationship:

Cell density of the upstream-side heater unit $\geq$ Cell density of the downstream-side heater unit.

11. The reformer according to claim 10, wherein the upstream-side heater unit and the downstream-side heater unit being installed by sandwiching only said one or more catalyst units therebetween satisfy the following relationship:

Cell density of the upstream-side heater unit $\geq$ Cell density of the downstream-side heater unit.

12. The reformer according to claim 10, wherein three or more of said two or more heater units are used with each of said at least one catalyst units in-between at different positions and having the upstream-side heater unit and the downstream-side heater unit with respect to the catalyst unit that is the most upstream satisfy the relationship:

Cell density of the upstream-side heater unit $\geq$ Cell density of the downstream-side heater unit.

13. The reformer according to claim 10, wherein three or more heater units are used and all of said upstream-side and downstream-side heater units satisfy the relationship:

Cell density of the upstream-side heater unit $\geq$ Cell density of the downstream-side heater unit.

14. The reformer according to claim 10, wherein said at least one catalyst unit contains one or more catalyst components selected from the group consisting of catalyst components for: steam reforming, partial oxidation, partial decomposition, CO shift reaction, and selective CO oxidation.

15. The reformer according to claim 14, wherein said one or more catalyst component contains a heat-resistant oxide and at least one metal element selected from the group consisting of V, Nb, Ta, Cr, Mo, W, Mn, Tc, Re, Fe, Ru, Os, Co, Rh, Ir, Ni, Pd, Pt, Cu, Ag, Au, Zn, Cd, and Hg.

16. The reformer according to claim 15, wherein said at least one metal element is at least one of those selected from the group consisting of Fe, Ru, Os, Co, Rh, Ir, Ni, Pd, Pt, V, Cr, Mo, W, Re, Cu, Ag, Au, and Zn.

17. The reformer according to claim 15, wherein said heat-resistant oxide is selected from the group consisting of $Al_2O_3$, $SiO_2$, $TiO_2$, $ZrO_2$, MgO, zeolite, SAPO, ALPO, a layer structure compound and a compound oxide thereof.

18. The reformer according to claim 10, wherein said two or more heater units contain one or more catalyst components selected from the group consisting of catalyst components for: steam reforming, partial oxidation, partial decomposition, CO shift reaction, and selective CO oxidation.

19. The reformer according to claim 10, wherein said two or more heater units are composed of a sintered or metallic material having electrical resistance heatability or a composite thereof, or a composite of a heat-resistant material having no electrical resistance-heatability and the above sintered or metallic material.

20. A reformer disposed in a flow path of a reactant fluid wherein the reactant fluid flows in a flow path from an upstream position to a downstream position, said reformer consisting of:

a reformer inlet for said reactant fluid to be reformed;

two or more electrically heatable heater units of honeycomb structure, adjacent to each other, installed in the direction of fluid flow where one is the upstream-side heater unit and the other is the downstream-side heater unit;

at least one catalyst unit of honeycomb structure for generating hydrogen from said reactant fluid containing an organic compound or carbon monoxide, by catalysis;

an outlet for a reformed gas containing hydrogen;

a fuel cell section which uses said reformed gas; and means to transfer said reformed gas from said outlet to said fuel cell section, wherein at least two adjacent heater units satisfy the following relationship:

Cell density of the upstream-side heater unit≦Cell density of the downstream-side heater unit.

21. The reformer according to claim 20, wherein three or more of said two or more adjacent heater units are installed in the direction of fluid flow and the heater unit at the most upstream position and a heater unit adjacent thereto satisfy the relationship:

Cell density of the upstream-side heater unit≦Cell density of the downstream-side heater unit.

22. The reformer according to claim 20, wherein three or more of said adjacent heater units are installed in the direction of fluid and all of said adjacent heater units satisfy the relationship:

Cell density of the upstream-side heater unit≦Cell density of the downstream-side heater unit.

23. The reformer according to claim 20, wherein said at least one catalyst unit contains one or more catalyst components selected from the group consisting of catalyst components for: steam reforming, partial oxidation, partial decomposition, CO shift reaction, and selective CO oxidation.

24. The reformer according to claim 23, wherein said one or more catalyst component contains a heat-resistant oxide and at least one metal element selected from the group consisting of V, Nb, Ta, Cr, Mo, W, Mn, Tc, Re, Fe, Ru, Os, Co, Rh, Ir, Ni, Pd, Pt, Cu, Ag, Au, Zn, Cd, and Hg.

25. The reformer according to claim 24, wherein said at least one metal element is at least one of those selected from the group consisting of Fe, Ru, Os, Co, Rh, Ir, Ni, Pd, Pt, V, Cr, Mo, W, Re, Cu, Ag, Au, and Zn.

26. The reformer according to claim 24, wherein said heat-resistant oxide is selected from the group consisting of $Al_2O_3$, $SiO_2$, $TiO_2$, $ZrO_2$, MgO, zeolite, SAPO, ALPO, a layer structure compound and a compound oxide thereof.

27. The reformer according to claim 20, wherein at least one heater unit out of the two or more heater units, adjacent to each other, contains one or more catalyst components selected from the group consisting of catalyst components for: steam reforming, partial oxidation, partial decomposition, CO shift reaction, and selective CO oxidation.

28. The reformer according to claim 20, wherein at least one heater unit out of the two or more heater units, adjacent to each other, is composed of a sintered or metallic material having electrical resistance-heatability or a composite thereof, or a composite of a heat-resistant material having no electrical resistance-heatability and the above sintered or metallic material.

* * * * *